May 12, 1931.  J. T. BOLEN  1,804,969
POWER DRAG SAW
Original Filed Feb. 11, 1928    2 Sheets-Sheet 2
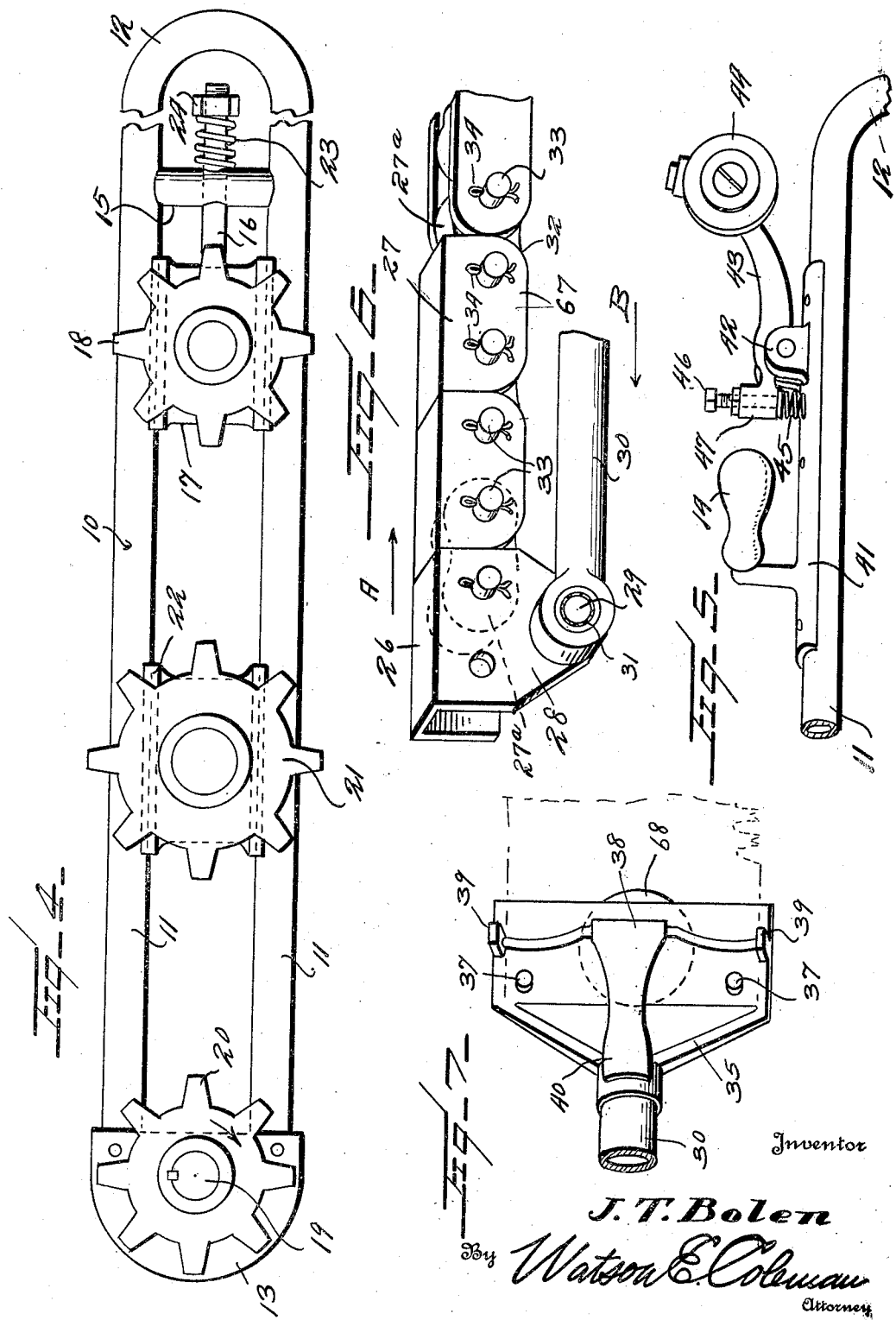
Inventor
J. T. Bolen
By Watson E. Coleman
Attorney Patented May 12, 1931

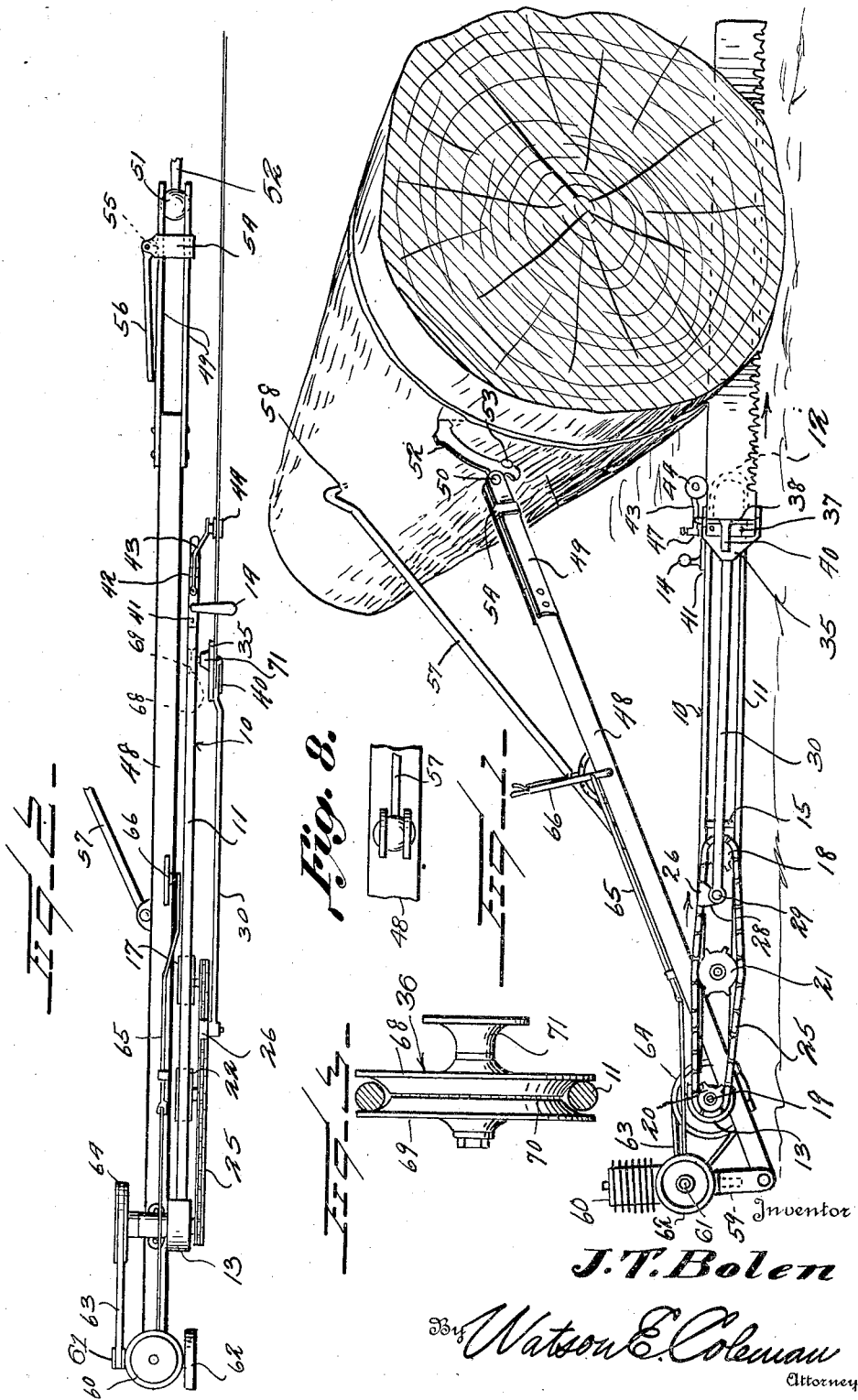

1,804,969

UNITED STATES PATENT OFFICE

JESSE T. BOLEN, OF BEAVERTON, OREGON, ASSIGNOR OF ONE-FOURTH TO KATIE D. CHRISTY AND ONE-FOURTH TO FRED CHRISTY, BOTH OF KLAMATH FALLS, OREGON

POWER DRAG SAW

Application filed February 11, 1928, Serial No. 253,719. Renewed October 2, 1930.

This invention relates to power drag saws, and particularly to a portable saw of this character designed to be taken into the timber and moved from place to place while there.

Heavy power drag saws weighing around two hundred pounds are entirely too heavy to be quickly and cheaply transported from cut to cut or place to place through timbered country where the ground is uneven and where the saw has to work in places which are overgrown and impeded with brush, rocks, stumps, slashings and the like. Millions of feet of timber are, therefore, cut by hand buckers simply because the heavy drag saws cannot be used.

The general object of the present invention is to provide an extremely simple, durable and directly driven saw weighing, with the motor, about eighty-five pounds, which may be easily transported by one man, quickly set up and quickly moved, and economically operated.

A further object is to provide a structure of this kind which is compact, simple, has few parts in which there is a direct thrust on the saw, and in which the saw is reciprocated by an endless chain.

A still further object is to provide a device of this character wherein the saw supporting frame and the saw oscillate in an arc whose axis is the driving axis of the saw.

Another object is to provide improved means for engaging the saw with this endless chain, and to provide improved means for urging the saw downward into the cut.

Other objects have to do with the details of construction and arrangement of parts as will appear more fully hereinafter.

My invention is illustrated in the accompanying drawings, wherein:—

Figure 1 is a perspective view of my power drag saw in use;

Figure 2 is a top plan view of the saw;

Figure 3 is an elevation of the supporting wheel for the saw;

Figure 4 is a side elevation of the saw supporting frame and the sprocket wheels;

Figure 5 is a perspective view of a portion of the saw supporting frame with the means whereby it may be lifted and the saw urged against the work;

Figure 6 is a perspective view of a portion of the sprocket chain and the pitman;

Figure 7 is a perspective view of the saw clamp;

Figure 8 shows the ball and socket connection between the holding bar and the shank of the dog.

Referring to these drawings, it will be seen that the supporting frame of the saw, designated 10, has the form of an elongated ellipse to provide upper and lower parallel tracks 11 and the rounded end portions 12. This frame 11 at one end is provided with a frame head and driving shaft bearing, designated 13, and at its opposite end is provided with a handle 14, which handle extends laterally beyond the frame, the shank of the handle extending downward from one end of the handle to the part 11 of the frame. The frame midway of its ends is provided with the cross bar 15, and passing through this cross bar 15 is the stem 16 which carries upon it the slide 17 which is fitted to slide upon the upper and lower portions 10 and 11 of the frame and carries upon it the lead and tightening idler sprocket wheel 18.

Mounted upon the frame head and driving bearing 13 is the shaft 19 which carries the driving sprocket 20, this sprocket being, of course, disposed in alignment with the sprocket 18. Intermediate the sprockets 18 and 20 is disposed the spacing or carrying idler sprocket 21 and this sprocket is supported upon the slide 22 which has sliding engagement with the upper and lower rods 10 and 11 of the frame and is entirely free. The stem 16 passes through the cross bar 15 and is provided with the coiled spring 23 and the nut 24 whereby the slide 17 may be drawn away from the sprocket 20 in order to tighten the chain 25. The spring 23 will, of course, exert yielding tension upon the sprocket chain 25. The chain 25, as shown in Figure 6, is formed of a plurality of ordinary sprocket chain links pivotally connected to each other in the usual manner and of a specially constructed link 26 and a plurality of links 27 disposed in advance of the link 26.

Preferably there are two of these links 27. The link 26 is formed to extend over on each side of the adjacent link of the ordinary sprocket chain and be riveted thereto, and one side wall of this special link 26 is downwardly extended, as at 28, and supports the outwardly projecting pivot pin 29 upon which the connecting rod 30 is mounted. Preferably this pin 29 is fitted with roller bearings 31 supporting the adjacent end of the connecting rod. I will hereafter call the link 26 the connecting rod link. The links 27 disposed in advance of the connecting rod link 26 are specially designed to prevent buckling and include specially designed cheek plates having rounded lower corners 32. Pivot pins 33 pivotally connect these links 27 to connecting links 27a, these pivot pins being held in place by cotter pins 34.

The outer end of the connecting rod 30, as shown in Figure 7, is provided with a head 35, one face of which carries a sectional roller 36 which fits between and engages with the rods 10 and 11 of the frame so as to support this head 35 for rectilinear movement. The head 35 is formed to provide a clamp for one end of the saw, and to this end is formed with laterally projecting pins 37 and an eccentric clip 38 mounted in ears 39 and having a handle 40. When this handle is forced downward, the saw, which is provided with openings for the dowel pins 37, is gripped firmly to the head. When the handle is raised the saw may be removed and a new saw inserted. This permits a quick changing of the saw.

For the purpose of holding the saw down to its work, I mount upon the upper rail or rod 11 a base 41 which supports the handle 14 and which also is provided with the upwardly projecting ears 42. Pivotally mounted between these ears is the arm 43 carrying a roller 44 at its extremity which bears upon the back of the saw. The other end of this roller is provided with a coiled compression spring 45 which bears against the base plate 41 and forces the short end of the arm 43 upward and the roller 44 downward. The degree of pressure exerted upon the saw may be regulated by means of the screw 46 which extends through the socket 47 formed in the short end of the arm 43, the spring bearing against this screw. Obviously, as the screw is tightened, the tension exerted by the spring will be increased.

Operating in conjunction with the frame formed of the rails 10 and 11 is the holding bar 48. This bar is formed of a straight piece of tubing, and attached to the end of this tubing are the two longitudinally extending cheek plates 49. These at their forward ends are formed with hemispherical recesses 50 for engagement with a ball 51 carried by the rear end of a dog 52, this dog having a sharp forward end adapted to be forced into a log and having a heel 53 whereby blows may be applied to cause the dog to pull out of the log. The plates or cheeks 49 are of spring steel and act to grip the ball 51, and mounted upon these plates or cheeks 49 is a slide 54 which is capable of being moved toward or from the extremity of the holding bar 48, this slide carrying a pivoted cam 55 having a handle 56. Sliding the shank nearer to the ball gives the cheeks a tighter grip thereon and further from the ball gives less pressure. Thus any desired adjustments may be had. Of course, the dog is thus mounted on the end of the holding bar for universal movement in any desired direction. This holding bar at its rear end is provided with a bearing for the shaft 19 which carries the sprocket wheel 20 and which supports the rear end of the frame 10. The holding bar has attached to it by a ball and socket joint the shank 57 which is provided at one end with the hook-shaped dog 58 which may be forced into the log at any desired point.

The rear end of the holding bar 48 is pivoted to the engine supporting pedestal 59. This pedestal is formed with a square socket in its upper end and the engine 60 seats in this square socket in the top end of the pedestal. This engine may be of any suitable construction but I have illustrated a compact internal combustion engine which drives a shaft 61 having thereon a fly wheel 62 and also having thereon a sprocket wheel from which a sprocket chain 63 runs over a sprocket wheel 64 mounted upon the shaft 19, this sprocket wheel 64 being of relatively large diameter in comparison with the sprocket wheel upon the shaft 61. A control rod 65 extends from the engine to a lever 66 mounted upon the holding bar 48. Inasmuch as the pedestal 59 is pivotally mounted upon the bar 48, the weight of the engine swinging rearward beyond a vertical plane will keep the belt or sprocket chain 63 taut at all times.

It will be seen that the supporting frame for the saw pivots around the shaft 19 at all times so that the saw constantly works from the same center. It is also to be noted that the saw is at all times in alignment with the connecting rod and with the roller 36, which will be hereafter described in detail, on the head 35 traveling between the upper and lower frame rails gives a bearing at that point for the saw, the connecting rod giving the other bearing at the link 26. The weight of the driving unit has a tendency to cause the chain 25 to sag and it is for this reason that I have provided the intermediate sprocket wheel 21 whose bearing guide slides freely between the upper and lower frame bars 10 and 11, thus compensating for any wear on the chain of the sprocket. The sprocket wheel 21 is slightly larger in diameter than the end sprockets so that the driving chain travels in an oval or elliptical path which will give the necessary rocking motion to the saw and will prevent the saw from traveling in an absolutely rectilinear path. This is aided by the link 26 which is ¼" shorter than the radius of either sprocket wheel, thus giving the saw the natural arm movement.

If I employed a link 26 that was ¼" longer than half the diameter of either end sprocket wheel, the saw and connecting rod would be given a tilt all at once as the link passed around either sprocket, but by making the middle idler larger and giving the sprocket chain driving shaft 19 a clockwise movement the saw travels upward and forward, then downward and forward, then rearward and downward, then rearward and upward, or in other words the saw gets a half inch tilt at either end and gradually more as it approaches the center idler and lessens after passing the center idler. Thus the saw has the motion which is ordinarily given to it by a sawyer. The length of the stroke is adjustable by adding or removing links from the chain 25.

My object in eliminating the old guides and the crank arms of the heavy saws is to get the proper thrust on the saw and by getting this I make it possible to use a lighter motor, doing away with the jerk and jump of the crank, for whenever the crank pin in the old structures is moving in a vertical direction, its thrust will be down at an angle and not in line with the travel of the saw. Therefore, more power is needed and this necessitates that the plant shall be very heavy. It is also to be noted that my drive chain is not guided or stiffened by sliding guides or grooves but runs freely on the sprockets.

Attention is particularly called to the fact that where only light work is being performed, the peculiarly shaped links 27 shown in Figure 6 are not necessary to be used, but that when a heavy pressure is placed on the saw these special links 27 are necessary. These special links, as shown in Figure 6, are approximately U-shaped in cross section so as to provide two inwardly extending flanges or cheeks 67 which have their corners rounded but have straight end edges both as regards the transverse web of the link and the flanges so that when the links are in the position shown in Figure 6 and traveling in the direction of the arrow A, the thrust of the saw urges the connecting rod 30 in the direction of the arrow B and the link 26 will have a large bearing surface against the end face of the next adjacent link 27 and this again against the next adjacent stiffening link 27. Thus the counterthrust on the connecting rod 30 will not cause the link 26 to tilt or tip up, which would be the case if several of the stiffening links 27 were not used immediately in advance of the link 26. The links are rounded at their bottom edges to permit them to break around the sprocket, but to force them in the opposite direction, that is to tilt these links under reverse strain imposed upon the connecting rod 30 is impossible, as their square ends in this case abut and thus keep the chain rigid. In other words, that part of the chain which is made up of these special links 26 and 27 is only flexible in one direction. More than two or three of the links 27 in front of the link 26 would render the chain too rigid.

I regard the spring 23 acting on the sprocket wheel 18 as one of the important features of this invention, as all vibration is taken care of and it keeps the sprocket chain 25 tight at all times as the rollers on the chain pass over the sprockets. In actual practice this spring 23 trembles continuously. The idler 21 is mounted for free sliding movement for one particular reason—if this idler were held fast in the frame, the main or front idler 18 could not oscillate and, therefore, would not be drawn back by the action of the spring to keep the chain taut to permit the unequal drag and pull to be overcome by the spring 23.

The roller 36 operates between the rails or bars 11. If this roller was formed in a single piece with relatively high flanges on each side, it would not turn freely because the weight supported by the roller is all on one side of the supporting frame and thus the tendency would be to cant the roller so that one side of the wheel would touch the right side of the frame and the lower side of the wheel would touch the left side of the frame. This would require that the roller, in order to move freely, should turn in both directions at once. It is to solve this problem that I have provided the detailed form of roller shown in Figure 3. The roller 36 is formed in two lateral sections 68 and 69 having ball bearings 70 between the sections, these sections operating on a single central shaft or spindle. This spindle is formed with a large head 71 which is riveted or otherwise attached to the back of the saw head 35. It will be seen from Figure 3 that one of the sections as, for instance, the section 69, when the weight of the saw bears downward upon the roller, will bear against the uppermost bar or rail 11, while the other section 68 will bear against the lowermost bar or rail 11 and these sections will rotate in reverse directions under these circumstances.

The universal joint which connects the dog 52 to the holding bar 48 provides for a tip, tilt or swing of the main frame to line the saw up for a perfect cut. This is absolutely necessary, as logs must be cut square across so that the lumber shall be uniform. The saw supporting frame 10 has only one connection to the main frame which is formed by the bar 48 and this makes it possible and practical to put the sawing unit on any drag saw now in use. The sawing unit can be operated by any air cooled gas engine of light weight or any other like motor. While I have illustrated the chain as being provided with the special links 27 and the special link 26, I do not wish to be limited to this as where the saw is to be used for light work these special links 27 are not absolutely necessary. They are preferable, however, in order to fit the saw for use in heavy work as well as light work.

I claim:—

1. A sawing machine including a saw supporting frame elongated in one direction and carrying forward and rear sprocket wheels and an intermediate sprocket wheel slightly larger than the forward and rear wheels, a sprocket chain passing around the first named wheels and over the second named wheel, a connecting rod at one end pivotally connected to the sprocket chain and at its other end having a member slidingly rockingly engaging the saw frame and having means for rigidly engaging a saw, a shaft for supporting and driving the rear sprocket wheel, and a motor operatively connected to the shaft, the shaft acting as the pivotal center of the saw supporting frame.

2. A sawing machine including a saw supporting frame elongated in one direction and carrying sprocket wheels, a sprocket chain passing around said wheels, a connecting rod having at one end sliding and rocking engagement with the supporting frame, and means connecting the chain to the other end of the connecting rod and supporting the inner end of the connecting rod for reciprocation at all times in a plane midway of the upper and lower flights of the chain.

3. A sawing machine including a saw supporting frame elongated in one direction and carrying sprocket wheels, a sprocket chain passing around said wheels, a connecting rod having at its outer end sliding and rocking engagement with the supporting frame, and a link forming part of the chain, the link having an inward extension, the inner end of the connecting rod being pivoted to said extension and being free to move with the bodily movement of the link and the pivotal point of said connecting rod being at all times midway between the upper and lower flights of said chain.

4. A sawing machine including a saw supporting frame elongated in one direction and carrying sprocket wheels, a motor driven shaft upon which one of said sprocket wheels is mounted, said shaft constituting a pivotal center for the frame, a sprocket wheel mounted upon the frame at a distance from the first named sprocket wheel, the frame extending beyond the second named sprocket wheel, an endless sprocket chain passing over the sprocket wheels and including a link having an inwardly projecting lug extending toward a plane medial of the upper and lower flights of the sprocket chain, a connecting rod pivoted at its rear end to said lug and at its forward end having a saw engaging head, and a saw rigidly carried by said head said head having a roller engaging the frame, the head thus being supported for true rectilinear movement throughout its entire travel.

5. A sawing machine including a longitudinally elongated saw supporting frame comprising upper and lower rails, sprocket wheels mounted one at the rear of the frame and the other midway of its ends, a sprocket chain carried upon the sprocket wheels and including a link having an inwardly extending lug, a connecting rod pivotally connected to said lug at its rear end and at its forward end having a head provided with a roller traveling upon said rails, a saw rigidly supported upon the end of the connecting rod, and a motor including a shaft, a shaft upon which the rear sprocket wheel is mounted and driven from said motor shaft, said sprocket wheel shaft thereby constituting the pivotal center upon which said frame oscillates.

6. A sawing machine including a supporting frame pivoted for vertical movement, sprocket wheels mounted upon the frame, a sprocket chain passing over said wheels and including a link having a lug extending inward toward the middle plane of the frame, a saw operating connecting rod slidably engaging the frame at its forward end, the rear end being free to move in a plane parallel to the plane of the upper and lower flights of the sprocket chain and being pivotally engaged at its rear end with said lug, a saw rigidly engaged with the connecting rod in line therewith and means for driving the first named sprocket wheel.

7. In a power sawing machine, a supporting frame, sprocket wheels mounted on the frame, a chain passing over the sprocket wheels, a saw operatively connected to the sprocket chain to be reciprocated thereby, and means for causing said saw to move upward and forward for one-half of a stroke, then downward and forward for the remainder of the stroke, then rearward and downward, and then rearward and upward.

8. In a power saw, a supporting frame, sprocket wheels mounted upon the frame, an endless chain passing over the sprocket wheels, the chain including a link having a lug projecting into the space between the upper and lower flights of the sprocket chain, said lug having a length slightly less than the radius of one of the sprocket wheels, a saw reciprocatingly mounted upon said frame and having a connecting rod operatively connected to the link, and a sprocket wheel disposed between the first named sprocket wheels and larger than the same over which said chain passes.

9. In a power saw, a supporting frame comprising upper and lower rails, a sprocket wheel mounted at one end of said frame and disposed laterally of the rails, a slide mounted at the other end of the frame, a sprocket wheel carried by said slide in alignment with the first named sprocket wheel, an intermediate freely movable slide, a sprocket wheel carried thereby in alignment with the first named sprocket wheels and larger than the same, an endless chain passing over all of said sprocket wheels and engaged therewith, the chain including a link having an inwardly extending lug, a connecting rod pivotally connected to the lug, and a saw connected to the connecting rod.

10. In a power saw, a supporting frame formed to provide upper and lower rails, a sprocket wheel mounted upon one end of said frame and disposed laterally of said rails, a slide mounted at the other end of the frame, a sprocket wheel carried by said slide in alignment with the first named sprocket wheel, means for exerting elastic tension on said slide to draw it away from the first named sprocket wheel, an intermediate slide freely movable upon said rails, a sprocket wheel carried thereby in alignment with the first named sprocket wheels and larger than the same, an endless chain passing over all of said sprocket wheels and engaged therewith, the chain including a link having an inwardly extending lug, a connecting rod pivotally connected to the lug, a saw connected to the connecting rod, the supporting frame having an extension, and the connecting rod at its junction with the saw carrying a member having rocking and sliding engagement with said extension.

11. A sawing machine including a saw supporting frame elongated in one direction and formed to provide upper and lower rails and carrying sprocket wheels, a sprocket chain passing around said wheels, a connecting rod at one end pivotally connected to the sprocket chain, a roller formed in two separate and independently revolvable sections, both of said sections engaging the upper and lower rails of the frame, said roller being operatively supported upon the forward end of the connecting rod, a saw rigidly engaged with the forward end of the connecting rod, and a motor operated shaft supporting and driving one of the sprocket wheels, the shaft acting as the pivotal center of the saw supporting frame.

In testimony whereof I hereunto affix my signature.

JESSE T. BOLEN.